United States Patent
Swartling et al.

(10) Patent No.: US 8,688,335 B2
(45) Date of Patent: *Apr. 1, 2014

(54) METHOD FOR CONTROL OF A GEARBOX (75) Inventors: Fredrik Swartling, Södertälje (SE);
Mikael Wågberg, Södertälje (SE)

(73) Assignee: Scania CV AB (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/395,489

(22) PCT Filed: Sep. 14, 2010

(86) PCT No.: PCT/SE2010/050983
§ 371 (c)(1),
(2), (4) Date: Mar. 12, 2012

(87) PCT Pub. No.: WO2011/031231
PCT Pub. Date: Mar. 17, 2011

(65) Prior Publication Data
US 2012/0173096 A1    Jul. 5, 2012

(30) Foreign Application Priority Data
Sep. 14, 2009 (SE) ..................... 0901182

(51) Int. Cl.
*G06F 7/00* (2006.01)
(52) U.S. Cl.
USPC ........................ 701/51; 477/120; 477/904
(58) Field of Classification Search
USPC .......... 701/51, 55, 64, 54, 95; 477/80, 110, 477/148, 84, 904, 120
See application file for complete search history.

(56) References Cited

U.S. PATENT DOCUMENTS

| 4,916,979 | A | 4/1990 | Irwin | 74/866 |
|---|---|---|---|---|
| 6,246,942 | B1 | 6/2001 | Dobler et al. | 701/51 |
| 6,702,713 | B2 | 3/2004 | Edelen et al. | 477/78 |
| 6,893,378 | B2 * | 5/2005 | Janecke et al. | 477/125 |
| 2006/0148615 | A1 * | 7/2006 | Steen et al. | 477/111 |
| 2009/0171543 | A1 | 7/2009 | Sato et al. | 701/55 |
| 2009/0203481 | A1 | 8/2009 | Nohara et al. | 475/150 |

FOREIGN PATENT DOCUMENTS

WO   WO 2007/067115   6/2007

OTHER PUBLICATIONS

International Search Report mailed Dec. 6, 2010 in corresponding PCT International Application No. PCT/SE2010/050983.
Russian Federation Office Action, dated Jun. 27, 2013, issued in corresponding Russian Patent Application No. 2012114598/11(022050), filed Sep. 14, 2010. Total 10 pages.

* cited by examiner

*Primary Examiner* — Thomas Black
*Assistant Examiner* — Luke Huynh
(74) *Attorney, Agent, or Firm* — Ostrolenk Faber LLP (57) ABSTRACT

A method for control of a gearbox (20) installed in a motor vehicle (1), which method effects a downshift of the gearbox (20) from a first gear (G1), for which the acceleration a of said vehicle (1) is negative, to a second gear (G2), for which the acceleration a is positive or substantially equal to nil, which downshift involves at least one intermediate gear step between the first gear (G1) and second gear (G2). An engine speed for changing gear at an intermediate gear step is higher than an engine speed for changing gear at a preceding intermediate gear step. Also a system, a motor vehicle, a computer program and a computer program product for performing the method are disclosed.

19 Claims, 5 Drawing Sheets

METHOD FOR CONTROL OF A GEARBOX

CROSS-REFERENCE TO RELATED APPLICATIONS

The present application is a 35 U.S.C. §§371 national phase conversion of PCT/SE2010/050983, filed Sep. 14, 2010, which claims priority of Swedish Application No. 0901182-6, filed Sep. 14, 2009, the contents of which are incorporated by reference herein. The PCT International Application was published in the English language.

TECHNICAL FIELD

The present invention relates to a method for control of a gearbox. The invention further relates to a system, a motor vehicle, a computer program and a computer program product for performing the method.

BACKGROUND TO THE INVENTION

Figure 1:
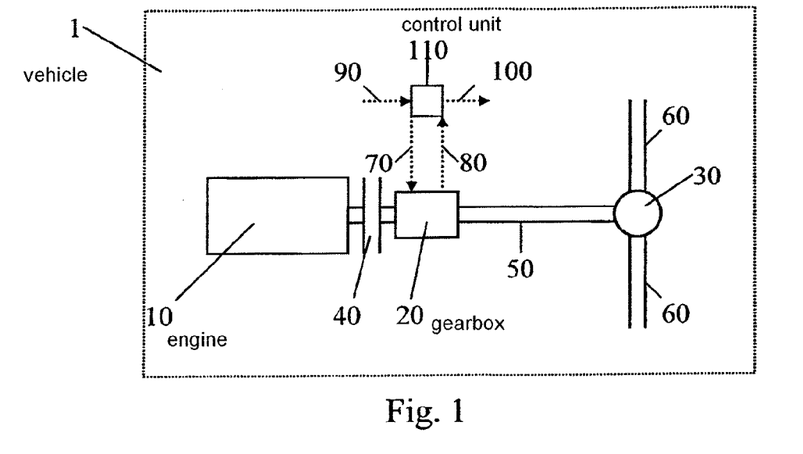
FIG. 1 depicts schematically part of a power train for a motor vehicle.

FIG. 1 depicts schematically parts of a power train for a motor vehicle 1, such as a passenger car or a heavy vehicle 1, e.g. a truck or bus. The power train comprises an engine 10 mechanically connected by a shaft to a first end of a gearbox 20 via a clutch device 40. The gearbox 20 is also mechanically connected, at its other end, by a propeller shaft 50 to a differential gear 30 associated with a rear axle. The rear axle comprises respective left and right drive shafts 60 which drive the vehicle's 1 powered wheels (not depicted in the diagram).

With this well-known arrangement, the mechanical work of the engine 10 is transmitted via various transmission devices, e.g. clutch device 40, gearbox 20, propeller shaft 50, differential gear 30 and drive shafts 60, to powered wheels in order to move the vehicle 1. An important device in the power train is the gearbox 20, which has a number of forward gears for moving the vehicle forwards, and usually also one or more reverse gears. The number of forward gears varies but modern kinds of trucks are, for example, usually provided with twelve forward gears.

The gearbox 20 may be of manual or automatic type (automatic gearbox), but also of the automatic manual gearbox type (automatic manual transmission, AMT). Automatic gearboxes and automatic manual gearboxes are automated gearbox systems usually controlled by a control unit 110, sometimes also called electronic control unit (ECU), which is adapted to controlling the gearbox 20, e.g. during gear changing for choice of gear at a certain vehicle speed with a certain running resistance. The ECU may measure the speed of the engine 10 and the state of the gearbox 20 and control the gearbox 20 by means of solenoid valves connected to compressed air devices. Information about the engine 10, e.g. its speed and torque, is also sent from the engine 10 to the ECU, e.g. via a CAN (controller area network) bus in the vehicle 1.

In conventional gear change systems, the control unit 110 uses tabulated engine speed limits, also called shift points, which represent the engine speed at which a downshift or upshift should be effected in the gearbox 20. This means that the system changes gear when the speed of the engine 10 passes a speed represented by a shift point. The shift points may therefore be construed as providing information not only about when a downshift or upshift should take place but also about the number of gear steps to be effected at each downshift or upshift. It is usual for each shift point to comprise one to three gear steps, although more steps are possible.

Figure 2:
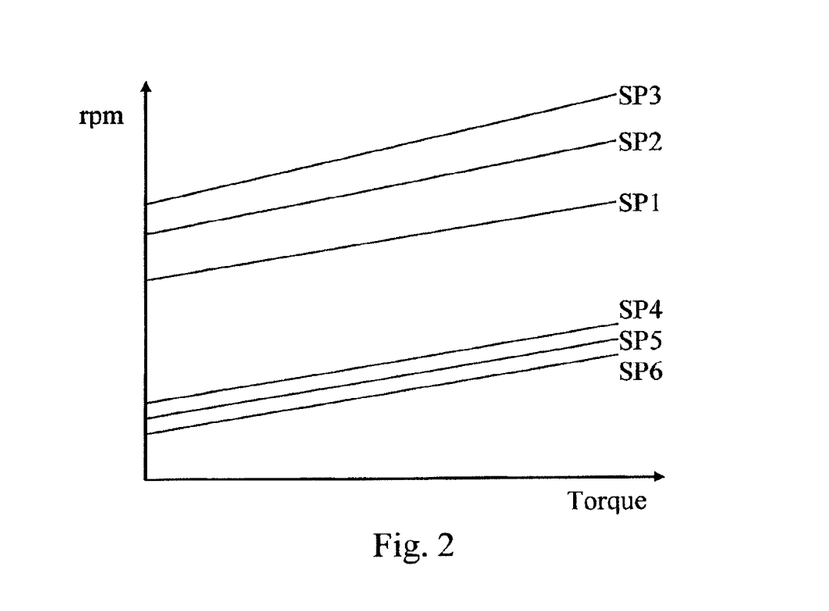
FIG. 2 is a graph of downshift and upshift lines.

FIG. 2 depicts an example of various tabulated shift points represented by lines SP1-SP6 in a graph where the x axis represents engine torque and the y axis the speed of the engine 10 in revolutions per minute (rpm). So long as a current engine speed is between shift lines SP1 and SP4 no gear change takes place, but if the current engine speed passes an upshift line, SP1-SP3, an upshift is initiated, and conversely a downshift is initiated if the current engine speed drops below a downshift line, SP4-SP6.

Table 1 below shows a number of upward or downward gear steps for each of the lines SP1-SP6 in FIG. 2. For example, an upshift by one step takes place if the engine speed rises above line SP1 and a downshift by two steps take place if the engine speed drops below line SP5.

TABLE 1

Numbers of gear steps for downshift and upshift lines SP1-SP6

| | |
|---|---|
| SP1 | Engine speed for upshift by 1 step |
| SP2 | Engine speed for upshift by 2 steps |
| SP3 | Engine speed for upshift by 3 steps |
| SP4 | Engine speed for downshift by 1 step |
| SP5 | Engine speed for downshift by 2 steps |
| SP6 | Engine speed for downshift by 3 steps |

Shift point choices affect inter alia running characteristics, acceleration, comfort and fuel consumption for the vehicle 1, so shift points have to be accurately calibrated by vehicle manufacturers. This calibration generally involves various gear change strategies being tested in the field in different driving situations, e.g. with different amounts of acceleration applied, different road gradients and different vehicle-combination weights. The test results have then to be thoroughly analysed to determine appropriate shift points, which is very time-consuming since there is an almost infinite number of combinations of different power trains, driving situations and vehicle weights.

BRIEF DESCRIPTION OF THE INVENTION

An object of the invention is to propose a method for control of a gearbox which wholly or partly solves the problems of the state of the art. Another object of the present invention is to propose an alternative method for control of a gearbox.

According to an aspect of the invention, the above objects are achieved with a method for control of a gearbox intended to be installed in a motor vehicle, which method effects a downshift of said gearbox from a first gear for which the acceleration a of said vehicle is negative to a second gear for which the acceleration a is positive or substantially equal to nil, which downshift involves at least one intermediate gear step between said first and second gears, an engine speed for changing gear at an intermediate step being higher than an engine speed for changing gear at a preceding intermediate step.

The invention relates also to a computer program which comprises program code and which, when said program code is executed in a computer, causes said computer to effect the above method for control of a gearbox. The invention relates also to a computer program product belonging to said computer program.

According to another aspect of the invention, the above objects are achieved with a system for control of a gearbox, which system comprises at least one control unit intended to control a gearbox in a motor vehicle, which system is adapted to effecting a downshift of said gearbox from a first gear for which the acceleration a of said vehicle is negative to a second gear for which the acceleration a is positive or equal to nil, which downshift involves at least one intermediate gear step between said first and second gears, with a maximum engine speed at each intermediate step which is as high as, or higher than, a highest engine speed at a preceding intermediate step.

The system according to the invention may also be modified in accordance with the various embodiments of the above method. The invention relates also to a motor vehicle comprising at least one system as above.

An advantage of the invention is improved hill climbing in that the vehicle's speed at the time of beginning to climb a hill is utilised, making it possible to reduce both fuel consumption and the number of gear changes. The driver will also find feel that the vehicle is powerful in that a highest engine speed at each intermediate gear step is as high as, or higher than, a highest engine speed at a preceding intermediate step uphill, and thereby utilises the engine's maximum power output in an effective way.

Further advantages and applications of a method and a system according to the invention are indicated by the detailed description set out below.

BRIEF DESCRIPTION OF DRAWINGS

The present invention is described with reference to the attached drawings, in which.

DETAILED DESCRIPTION OF THE INVENTION

Conventional gear change systems described above choose gears according to prevailing running conditions, using fixed shift points such as depicted in FIG. 2. If the vehicle 1 is for example embarking upon an upgrade and a current gear is not appropriate because the vehicle is losing speed uphill, the gear change system has to choose a different gear for the vehicle 1 to run in.

A problem in this situation is that of choosing a gear which results in low fuel consumption but also causes the engine 10 to run at a speed which delivers sufficient power output for the driver to feel that the vehicle is powerful all the way up the hill. Powerful means here that the speed of the engine 10 is close to its maximum power output speed.

As vehicles 1 may have different specifications, e.g. gearbox ratio, rear axle ratio and wheel radius, the same vehicle speed may be achieved at different engine speeds for vehicles 1 with different specifications. This makes the use of fixed shift points problematical in that they may suit certain vehicle specifications but not others. The same kind of problem may also arise if for example a vehicle 1 changes from one wheel radius to another, resulting in a different overall transmission ratio.

A situation which may therefore arise when a vehicle 1 is travelling uphill is that a downshift may take place too early or too late because the fixed shift points are not appropriate to a certain vehicle specification. Too early a downshift may make the vehicle 1 feel "nervous", i.e. changing gear too often and being unstable, along with increased fuel consumption. Too late a downshift means that the power output of the engine 10 is not utilised in an optimum way, since the vehicle 1 loses more speed than necessary.

The present invention therefore relates to a method which implements a gear change strategy for a gearbox 20 and which wholly or partly eliminates the disadvantages of the state of the art. The gearbox 20 is preferably of the kind which forms part of an automated gear change system controlled by a control unit 110 (ECU). In such a system, gear changes are effected automatically by the control unit 110, but it is also usual for the driver to be able to execute manual gear changes in such an automated gear change system, this being known as manual gear change in automatic state (automatic mode). The gearbox 20 also comprises a plurality of gears, e.g. 12 forward gears and one or more reverse gears.

The concept with a method according to the invention is that a downshift strategy is applied whereby the gear change system changes from a first gear G1 for which the acceleration a of the vehicle 1 is negative (power deficit gear) to a second lower gear G2 for which the vehicle's 1 acceleration a is positive or equal to nil, via one or more intermediate gear steps. According to the present invention, an engine speed for changing gear at an intermediate step has to be higher than an engine speed for changing gear at a preceding intermediate step, which means that the engine speed when changing gear increases for each intermediate step.

A driver of the vehicle 1 will feel that such a downshift process is powerful and that the vehicle 1 "applies itself", e.g. on an upgrade, since it will run more at the maximum power output of the engine 10 for each successive intermediate gear during the downshift. Provided that the maximum power output speed of the engine 10 (often about 1800 rpm for trucks) is not exceeded, a higher speed will mean that the engine 10 delivers more power. The engine 10 thus becomes and is felt to be more powerful the higher the engine speed at which the vehicle 1 is driven.

The expressions "negative" and "positive or equal to nil" in this description are to be taken to mean substantially "negative" and substantially "positive or equal to nil" respectively. The reason is that the acceleration a of the vehicle 1 may momentarily assume a value which is "positive or equal to nil" for the first gear G1, but the acceleration a averaged over a period of time may nevertheless be negative. As specialists will appreciate, the same also applies with regard to the vehicle's 1 acceleration a when travelling with the second gear G2 engaged.

"Power deficit gear" in this description means a gear with a ratio such that the vehicle 1 does not have enough driving power to maintain a constant speed in that gear. "Power equilibrium gear" means the highest gear in which the vehicle 1 can maintain a constant speed, i.e. the vehicle 1 being in power equilibrium. It should be noted that the negative acceleration a in the first gear G1 is due to the engine 10 not being able to deliver sufficient power in the first gear G1, resulting in power deficit.

According to an embodiment of the invention, a highest engine speed at each intermediate step is as high as, or higher than, the highest engine speed at a preceding intermediate step. The engine speed for each intermediate step is for example within the range 1000-2500 rpm for trucks and buses.

According to an embodiment of the invention, a highest engine speed at each intermediate step is as high as, or higher than, a highest engine speed at a preceding intermediate step.

Also, according to an embodiment of the invention, the highest engine speed at each intermediate gear step increases by a parameter value $p_i$. The relationship between the highest engine speed at an intermediate step and the highest engine speed at the preceding intermediate step is preferably $\omega_T^{i+1}=\omega_T^i+p_i$, where $\omega_T^{i+1}$ is the highest engine speed at an intermediate step and $\omega_T^i$ is the highest engine speed at the preceding intermediate step.

The engine speed $\omega_T^i$ at an intermediate gear step is thus a highest engine speed which the vehicle 1 has had since the acceleration a became negative, i.e. the highest engine speed which the vehicle 1 has had since it went into power deficit. Said engine speed $\omega_T^i$ may be construed as a target speed which the gear change system endeavours to reach after each intermediate step in the downshift according to this embodiment of the invention.

The parameter value $p_i$ may also be construed as a tolerance value, since the engine speed after each gear change may deviate from a simulated speed. The magnitude of the tolerance value $p_i$ may also be varied to influence how quickly said engine speed $\omega_T^i$ should increase, e.g. for different driving modes such as economy mode or power mode. It should also be noted that the parameter value $p_i$ need not be constant but may be variable and assume different values for different gears.

According to a further embodiment of the invention, the acceleration a is nil or substantially nil for the second gear G2. The acceleration a, expressed for example in m/s² or rpm/s, for the second gear G2 may be compared with a threshold value A to check whether the condition of being positive or nil is fulfilled. The acceleration a may also be compared with this threshold value A during a specific period of time to avoid momentary deviations of the acceleration a which might lead to incorrectness in the comparison. Checking the value of the acceleration a for the second gear may also be done by comparing a calculated running resistance with a calculated driving force to decide whether the acceleration a will be greater than or equal to nil in the second gear G2.

With regard to intermediate gear steps in the present method it is possible for one or more of them to be effected between the first gear G1 and the second gear G2 according to an embodiment of the invention. Moreover, the number of steps between the first gear G1 and an intermediate step, and/or between two consecutive intermediate steps, and/or between an intermediate step and the second gear G2, may be one or more.

According to a preferred embodiment of the invention, the time which each intermediate gear step lasts is longer than a threshold value $T_i$. How long the vehicle 1 can run in a certain intermediate gear may preferably be compared with a gear-specific calibrated threshold value $T_i$. This means that, according to an embodiment of the invention, if an intermediate gear is to be regarded as a permissible intermediate between the first gear G1 and the second gear G2, the vehicle 1 has to be able to run in it for at least a longer time than the threshold value $T_i$ for that specific gear.

The reason why it is not appropriate for the vehicle 1 to run for too short a time in an intermediate gear is that when the vehicle 1 changes gear it loses power transmission from the power train and will therefore lose speed during the actual gear change process. For this reason it is preferable for such a situation to be avoided, since the vehicle may lose more speed if the gear change system chooses to change gear via an intermediate gear than if it skips said intermediate gear and instead changes down a further one or more steps during the downshift.

Effecting a downshift and thereafter running in the resulting gear for too short a time also entails discomfort for the driver and any passengers, so the gear change system may use gear-specific calibrated threshold values $T_i$ as described above. These calibrated threshold values $T_i$ also determine how likely it is that the system will or will not skip an intermediate gear when calculating a downshift from the first gear G1 to the second gear G2. The greater the value adopted as a gear-specific calibrated threshold value $T_i$, the more likely it is that the system will skip an intermediate gear, whereas the smaller the value adopted as the threshold value $T_i$, the less likely it is that the system will skip an intermediate gear. Accordingly, the threshold value $T_i$ may be used as a parameter for determining the number of gear steps at each intermediate step and/or for determining the number of intermediate steps between the first gear G1 and the second gear G2 according to different embodiments of the invention.

Time values for the gear-specific threshold values $T_i$ may preferably assume a value of between 1 and 15 seconds for heavy vehicles 1, e.g trucks and buses, depending on the behaviour desired during the downshift, e.g downshift rate and downshift rhythm. The threshold values $T_i$ may therefore be used as design parameters in the configuration of different downshift behaviours of the gear change system, since the threshold values $T_i$ will determine the number of intermediate steps and the number of gear steps at each intermediate step as described above.

According to another embodiment of the invention, a current intermediate gear step lasts the same amount of time as an immediately following intermediate step, since the downshift will then be felt to be consistent and positive by most drivers. The reason is that drivers generally do not want the gear change system to make arbitrary gear changes "a bit here and a bit there", which he/she may find nervous and arbitrary. "Same amount of time" in this context means that the respective times are of approximately equal length.

The inventors have also found in their inventive work that an engine speed in the first gear G1 $\omega_{G1}$ can be used as an input parameter for determining a downshift from a first gear G1 to a second gear G2 according to a preferred embodiment of the invention. This $\Omega_{G1}$ is a speed which the engine 10 has when the vehicle 1 is travelling with the first gear G1 engaged.

Figure 4:
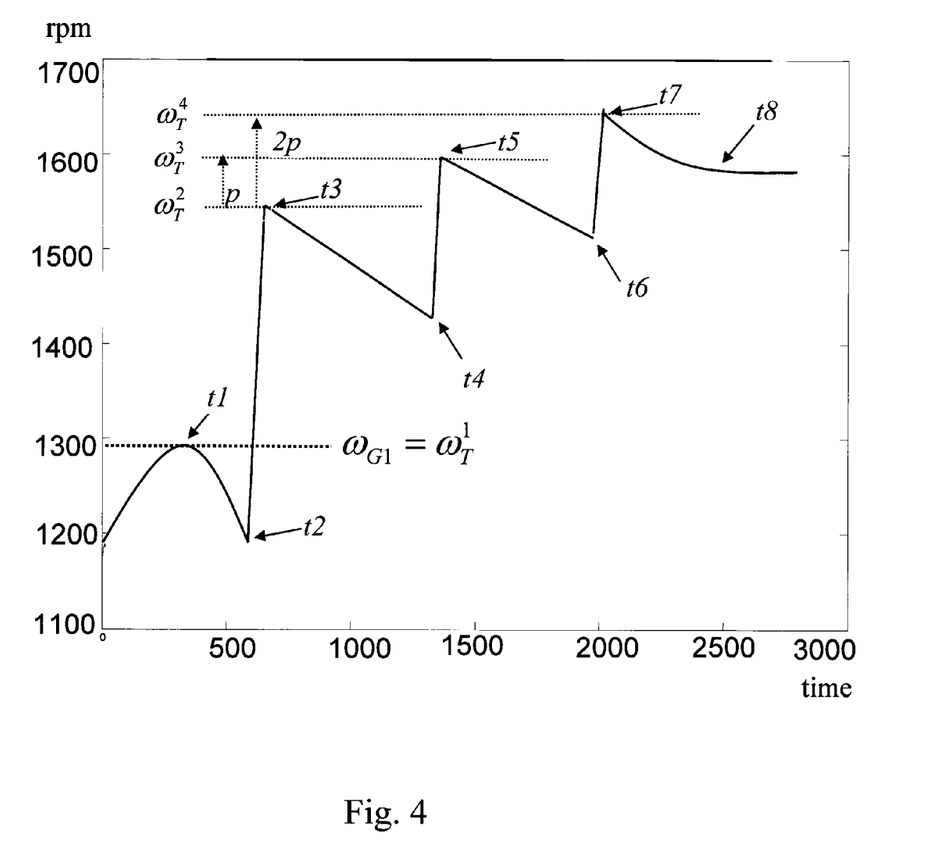
FIG. 4 depicts an example of downshift from a first gear G1 to a second gear G2 according to the invention.

Said engine speed $\omega_{G1}$ is preferably that which the vehicle 1 has when it goes into a state of power deficit in the first gear G1, e.g. when beginning to climb a hill. This means that the highest engine speed in the first gear G1 will be said speed $\omega_G$, which may be construed as an engine speed at which a relevant driving power in the first gear G1 becomes smaller than a relevant running resistance in the same gear. FIG. 4 depicts an example of said engine speed $\omega_{G1}$.

An advantage of this embodiment is that since the gear change system works on the basis of the engine speed which the vehicle 1 had when it began the climb, i.e. the engine speed which the vehicle had when it went into power deficit $\omega_{G1}$, the shift points are automatically adapted to achieve the same behaviour for different power trains. For this reason, calibration of shift points is not related to different engine types or power trains according to the invention, but only to different driving modes, e.g. economy mode or power mode. The advantage of this procedure is that time need not be involved in calibration with respect to different types of power trains or engines 10, making it possible to concentrate instead on calibration of a general behaviour for every type of vehicle 1.

A further advantage of this embodiment is that if the driver changes down manually before or on the hill, the gear change system will treat the engine speed increased by the driver in the same way as if the system had itself done an aggressive downshift. The system will accordingly continue to change gear aggressively all the way up the hill. This makes it easy for the driver to control the way in which the hill climb is conducted, since a high engine speed value for the first gear G1 $\omega_{G1}$ leads to more aggressive hill climbing than a lower engine speed value for the first gear G1 $\omega_{G1}$.

Figure 3A:
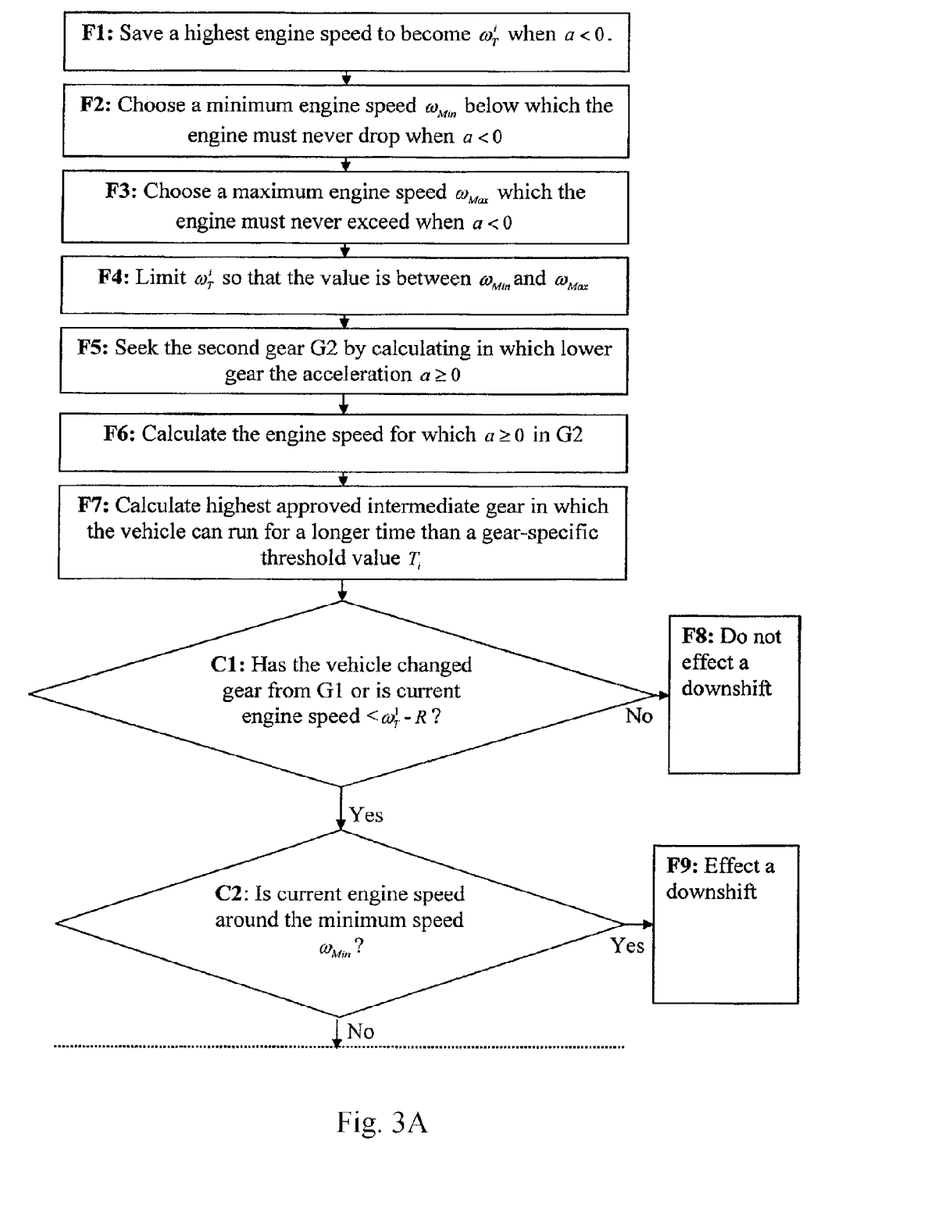
FIGS. 3A and 3B together and in sequence define a flowchart of an embodiment of the invention.
Figure 3B:
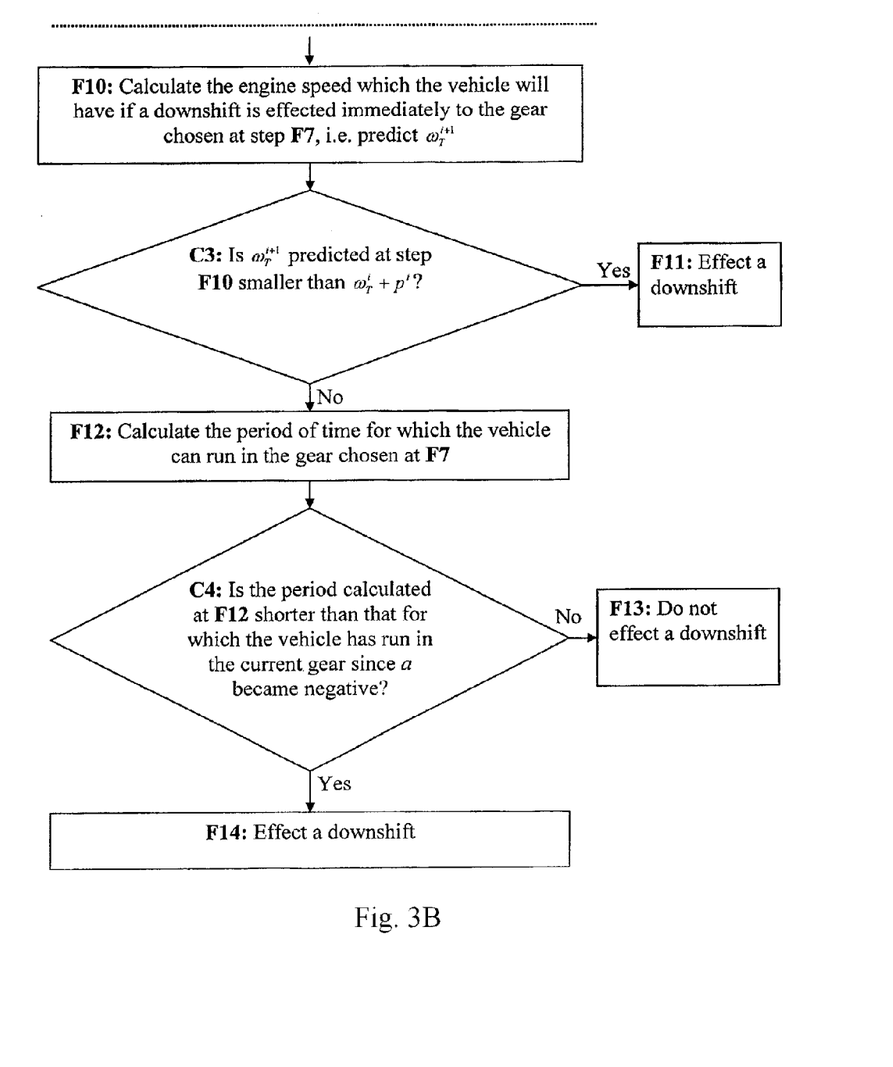

FIGS. 3A and 3B together and in sequence are a flowchart of an exemplified embodiment of a method according to the present invention. This flow is conceived as being evaluated continuously by the gear change system whenever the vehicle 1 is in power deficit, which means that the system assesses whether a gear change should or should not be effected, starting from step F1 at predetermined intervals of time.

Step F1 checks whether a current engine speed is higher than a highest engine speed which the vehicle 1 has had since it has been in power deficit, i.e. a<0. If such is the case, this current engine speed is saved to become a first highest engine speed $\omega_T^i$, for use as a reference speed in the gear change process.

Step F2 chooses a suitable minimum engine speed $\omega_{Min}$ which is not to be dropped below when the acceleration a is negative (i.e. when the vehicle 1 is in power deficit), depending inter alia on how quickly the vehicle 1 loses speed, the road gradient derivative and the driving mode being used by the vehicle 1. For example, a lower minimum engine speed $\omega_{Min}$ is chosen if the road gradient derivative is decreasing, i.e. when the vehicle 1 is approaching the crest of a hill. The minimum speed $\omega_{Min}$ is preferably also chosen such that a current engine speed never drops below the maximum torque curve of the engine 10 to ensure that the latter delivers sufficient power output throughout the downshift process, and such as to avoid uncomfortable vibrations from the power train.

Step F3 chooses a suitable maximum engine speed $\omega_{Max}$ defined as a speed not to be exceeded during the gear change process when a<0. This maximum speed $\omega_{Max}$ may for example be related to fuel consumption and/or desired power output. For heavy vehicles 1, this maximum speed $\omega_{Max}$ may for example be 1600 rpm to ensure that the fuel consumption will not be too high or 2100 rpm if maximum power output is prioritised. It will therefore be appreciated that said maximum speed $\omega_{max}$ may depend on the mode in which the vehicle is being driven.

Step F4 limits the engine speed $\omega_T^i$ so that it assumes a value within the range defined by the minimum speed $\omega_{Min}$ and the maximum speed $\omega_{Max}$. Thus $\omega_T^i$ may be set to the minimum speed $\omega_{Min}$ ($\omega_T^i=\omega_{Min}$) if $\omega_T^i$ assumes a value below the range, and to the maximum speed $\omega_{Max}$ ($\omega_T^i=\omega_{Max}$) if $\omega_T^i$ assumes a value above the range.

Step F5 seeks the second gear G2 by calculating to which of possible available lower gears the vehicle 1 has to change in order to ensure that the acceleration a is greater than or equal to nil in that gear, i.e. a≥0. The second gear G2 is calculated by the gear change system checking in which lower gear the vehicle's 1 driving power exceeds a calculated running resistance, i.e. the total force acting against the vehicle 1 in its direction of movement. For purely practical reasons, the second gear G2 may be calculated by the system calculating step by step the vehicle's maximum driving force for gears lower than the first gear G1, and choosing the first lower gear—if the calculation is done step by step from highest to lowest gears—which has a maximum driving force as great as or greater than the calculated running resistance to the vehicle 1.

Step F6 calculates thereafter the engine speed in the second gear G2 at which the driving power of the vehicle 1 exceeds or is equal to its running resistance (a≥0), in order to be able to decide when a downshift to the second gear G2 should be effected to ensure that the engine speed after the downshift to the second gear G2 is close to the equilibrium speed immediately after the downshift, the equilibrium speed being that at which the acceleration of the vehicle 1 is substantially nil.

Step F7 calculates how long the vehicle 1 can run in each of the intermediate gears if there are a number of them between the first gear G1 and the second gear G2. How long the vehicle can run in each intermediate gear is compared with a gear-specific calibrated time value, i.e. a threshold value $T_i$, for each intermediate gear. These comparisons provide a basis for choosing the highest intermediate gear from among the permissible intermediate gears, i.e. the gears which have a calculated time value greater than their respective threshold value $T_i$. It should be noted that the gear chosen at step F7 is the second gear G2 if no higher gear meets the requirements as above.

Moreover, step C1 checks at gear changes from the first gear G1 to see whether the speed of the engine 10 has dropped more than a calibrated limit value R from the highest engine speed which the vehicle 1 had when it went into power deficit $\omega_{G1}$. The limit value R may vary depending on driving mode, e.g. economy mode or power mode. Only when the engine speed has dropped more than the calibrated limit value R (preferably 1-100 rpm) is a downshift permissible. This limit value R is used in the process so that the vehicle will not be felt to be nervous or unstable, e.g. when beginning to climb a hill, since otherwise there might be a downshift as soon as the road gradient so allows. This check at step C1 need not be done from intermediate gears, since the vehicle will then already be on a hill, which means that the check at C1 is only relevant from the first gear G1.

At step F8 no downshift takes place if the check at C1 shows that the engine speed has not dropped more than the limit value R. This is to prevent the system from changing gear when the running resistance temporarily increases, e.g. on short hills, which would make the vehicle 1 feel nervous.

Step C2 checks whether the current engine speed is close to the minimum speed $\omega_{Min}$, and if such is the case an immediate downshift is effected at step F9 to the gear chosen at step F7, since there is then risk of the engine dropping below the minimum speed $\omega_{Min}$.

If such is not the case, step F10 predicts the engine speed which the vehicle 1 will have after a downshift to the gear chosen at step F7, i.e. $\omega_T^{i+1}$, if the current engine speed at step C2 is not below the minimum speed $\omega_{Min}$.

Thereafter, step C3 checks whether the current engine speed $\omega_T^{i+1}$ predicted at step F10 is less than $\omega_T^i+p^i$, which is the highest speed which the engine 10 has had since it went into power deficit, and a tolerance value $p_i$ according to $\omega_T^{i+1}=\omega_T^i+p_i$, i=1, 2, 3 . . . , as described above. It should be noted that according to this embodiment of the invention the first highest engine speed $\omega_T^i$ is the same as the highest speed in the first gear G1, i.e. $\omega_T^1=\omega_{G1}$ (see step F1). The highest engine speed in the first gear G1 will therefore affect the whole downshift process and thus serve as an input parameter for it.

Step F11 effects a downshift to the gear chosen at step F7 if the check at step C3 shows that the current engine speed is within the range I.

If such is not the case, step F12 calculates the time for which the gearbox 20 can run in the gear chosen at step F7. In a practical application, the gear change system calculates how long the vehicle 1 can run in each intermediate gear from the first gear G1 to the second gear G2, and chooses thereafter the highest of these intermediate gears which meets the requirement that its calculated time value be greater than its gear-specific calibrated threshold value $T_i$.

When calculating how long the vehicle 1 can run in an intermediate gear, the system can use the minimum speed $\omega_{Min}$ which is a lowest engine speed not to be dropped below by the vehicle, so if a current speed drops to below, for example, $\omega_{Min}$=1100 rpm, the system has to effect a downshift. It then calculates how long the vehicle can run in the intermediate gear from the engine speed which the system is at after changing gear until the system reaches the minimum speed, i.e. $\omega_{Min}$=1100 rpm. The system therefore calculates how long the vehicle 1 will be able to run in the intermediate gear by working out how quickly the engine 10 will lose speed in the intermediate gear on the basis of knowing its minimum speed $\omega_{Min}$ and what its speed after changing gear will be.

Finally, step C4 checks whether the time calculated at step F12 is as long as the time for which the vehicle 1 has run in a current gear since the acceleration a became negative. Step F14 effects a downshift to the gear chosen at step F7 if the check at C4 shows that the answer is affirmative. If the answer at step C4 is negative, no downshift takes place at step F13.

FIG. 4 depicts an example of a downshift of a motor vehicle 1 according to the invention, in a diagram in which the x axis represents time and the y axis the speed of the engine 10 in rpm. At time t1 when travelling with the first gear G1 engaged, the vehicle 1 embarks upon an upgrade, so a power deficit occurs and the vehicle's 1 acceleration a becomes negative. The engine speed in the first gear G1 $\omega_{G1}$ is determined at this time t1 and can be used as an input parameter during the downshift according to an embodiment of the invention.

As the vehicle 1 is in power deficit, the engine speed decreases and a first downshift takes place at time t2, causing the engine speed to go back up at t3. In this next gear too (first intermediate gear) a power deficit occurs and a further downshift needed to enable the vehicle to climb the hill takes place at time t4. This is repeated in FIG. 4 in that the engine speed goes back up t5, a power deficit occurs, and a further downshift takes place at t6 and the engine speed goes back up to t7. Thus the downshift involves one or more intermediate gear steps until the gearbox 20 reaches a power equilibrium gear, i.e. the second gear G2, at time t7 in FIG. 4. In this second gear G2 (from time t8) the acceleration a is substantially nil, so the vehicle 1 can maintain its speed in this gear.

It should also be noted that the highest engine speed for each intermediate gear is higher than or equal to the highest speed since the vehicle 1 went into power deficit, i.e. when the acceleration a became negative, as depicted at times t3, t5 and t7 in FIG. 4. This is done so that the vehicle will maintain its speed uphill as well as possible by being close to the maximum power output speed of the engine 10 in the intermediate gears. It also means that the vehicle 1 will be felt to be aggressive and powerful on, for example, long steep hills if it travels at high speed, since the engine speed will rise at each downshift step and thus come closer to the maximum engine speed which the vehicle 1 can maintain in the second gear G2. Better maintenance of vehicle speed at the beginning of the climb also makes it possible to reduce the number of downshift steps if the hill ends before the vehicle reaches the second gear G2.

It should also be noted that the various calculation steps in the method according to the invention take place in real time, as specialists will appreciate. They will also appreciate that a method for control of a gearbox according to the present invention might also be implemented in a computer program which, when executed in a computer, causes the computer to effect the method. The computer program is contained in a computer program product's computer-readable medium which takes the form of a suitable memory, e.g. ROM (read-only memory), PROM (programmable read-only memory), EPROM (erasable PROM), flash memory, EEPROM (electrically erasable PROM), hard disc unit, etc.

The present invention relates also to a system for control of a gearbox. The system comprises at least one control unit 110 intended to control a gearbox 20 in a motor vehicle 1 and adapted to effecting a downshift from a first gear G1 for which the acceleration a is negative to a second gear G2 for which the acceleration a is positive or equal to nil. The downshift involves at least one intermediate gear step between the first gear G1 and the second gear G2, and a highest engine speed at each intermediate step is as high as, or higher than, a highest engine speed at a preceding intermediate step.

A system described above may be also be modified according to the various embodiments of the above method. The present invention relates also to a motor vehicle 1, e.g. a truck or bus, which comprises at least one system as above.

Figure 5:
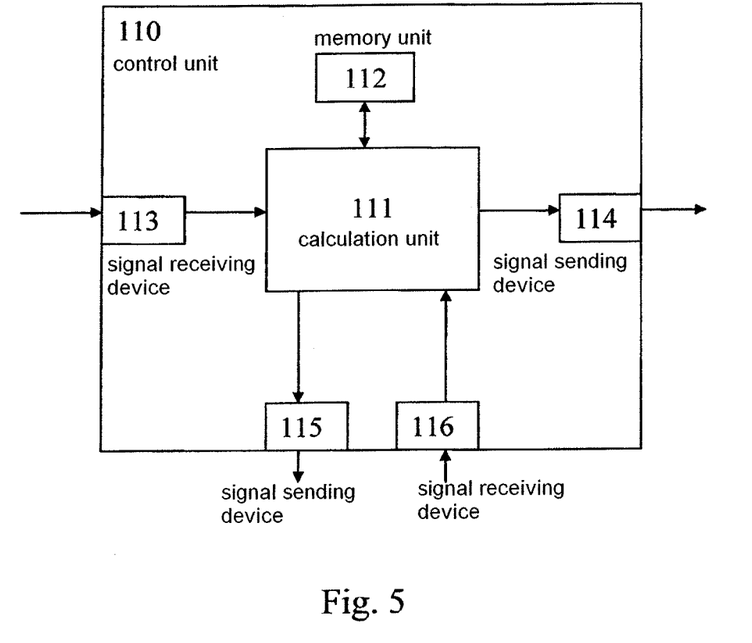
FIG. 5 depicts a control unit forming part of a system according to the invention.

FIG. 5 depicts schematically a control unit 110 forming part of a system according to the invention. The control unit 110 comprises a calculation unit 111 which may take the form of substantially any suitable type of processor or microcomputer, e.g. a circuit for digital signal processing (digital signal processor, DSP) or a circuit with a predetermined specific function (application specific integrated circuit, ASIC). The calculation unit 111 is connected to a memory unit 112 which is incorporated in the control unit 110 and which provides the calculation unit 111 with, for example, the stored program code and/or the stored data which the calculation unit 111 needs in order to be able to perform calculations. The calculation unit 111 is also adapted to storing partial or final results of calculations in the memory unit 112.

The control unit 110 is further provided with devices 113, 114, 115, 116 for respectively receiving input signals and sending output signals. These input and output signals may comprise waveforms, pulses or other attributes which the signal receiving devices 113, 116 can detect as information and which can be converted to signals processable by the calculation unit 111. The calculation unit 111 is then provided with these signals. The signal sending devices 114, 115 are adapted to converting signals received from the calculation unit 111 in order to create, e.g. by modulating the signals, output signals which can be transmitted to other parts of the system for determination of downshift and upshift points. One skilled in the art will appreciate that the aforesaid computer may take the form of the calculation unit 111 and that the aforesaid memory may take the form of the memory unit 112.

Each of the connections to the devices for respectively receiving input signals and sending output signals may take the form of one or more from among the following: a cable, a data bus, e.g. a CAN (controller area network) bus, a MOST (media orientated systems transport) bus or some other bus configuration, or a wireless connection. The connections 70, 80, 90, 100 in FIG. 1 may also take the form of one or more of these cables, buses or wireless connections.

Finally, the present invention is not limited to its embodiments described above, but relates to and comprises all embodiments within the scope of protection of the attached independent claims.

The invention claimed is:

1. A method for control of a gearbox installed in a motor vehicle comprising effecting a downshift of the gearbox from a first gear, for which acceleration a of the vehicle is negative, to a second gear, for which the acceleration a is calculated to be positive or substantially equal to nil, wherein the downshift involves at least one intermediate gear step between the first gear and the second gear, and wherein an engine speed for changing gear at an intermediate gear step is higher than an engine speed for changing gear at a preceding intermediate gear step.

2. A method according to claim 1, wherein each intermediate gear is chosen for a time such that each intermediate gear step lasts a longer time than a selected threshold value.

3. A method according to claim 2, wherein the threshold value is used as a parameter for determining a number of gear steps involved in a gear change between at least one of the first gear and an intermediate gear step, and between two consecutive intermediate gear steps, and between an intermediate gear step and the second gear.

4. A method according to claim 2, wherein the threshold value is used as a parameter for determining a number of intermediate gear steps between the first gear and the second gear.

5. A method according to claim 2, wherein the threshold value is specific for each intermediate gear step.

6. A method according to claim 2, wherein the threshold value is within a range of 1-15 seconds.

7. A method according to claim 2, wherein a current intermediate gear step lasts the same amount of time as an immediately following intermediate gear step.

8. A method according to claim 1, wherein an engine speed $\omega_{G1}$ in the first gear is used as an input parameter when effecting the downshift.

9. A method according to claim 8, wherein the engine speed $\omega_{G1}$ in the first gear is an engine speed which the vehicle assumes when the acceleration a of the vehicle becomes negative in the first gear.

10. A method according to claim 8, wherein the engine speed $\omega_{G1}$ in the first gear is a highest engine speed in the first gear.

11. A method according to claim 1, wherein a highest engine speed at each intermediate step is as high as, or higher than, a highest engine speed at a preceding intermediate step.

12. A method according to claim 11, in which the highest engine speed at each intermediate gear step assumes a value which is $p_i$ higher than the highest engine speed at a preceding intermediate gear step, wherein $p_i$ is a parameter value.

13. A method according to claim 12, wherein a relationship between the highest engine speed at each intermediate gear step and the highest engine speed at a preceding intermediate gear step is expressed by $\omega_T^{i+1} = \omega_T^i + p_i$, where $\omega_T^{i+1}$ is the highest engine speed at each intermediate gear step and $\omega_T^i$ is the highest engine speed at a preceding intermediate gear step.

14. A method according to claim 1, wherein a gear change between at least one of the first gear and an intermediate gear step, and between two consecutive intermediate gear steps, and between an intermediate gear step and the second gear comprises one or more gear steps.

15. A method according to claim 1, wherein a gear change between at least one of the first gear and an intermediate gear step, or between two consecutive intermediate gear steps, or between an intermediate gear step and the second gear comprises one or more gear steps.

16. A computer program product comprising a non-transitory computer-readable storage medium and a computer program contained in the computer-readable medium and the computer program comprises program code which, when the program code is executed in a computer, causes the computer to effect a method according to claim 1.

17. A system for control of a gearbox, the system comprises at least one control unit which controls a gearbox in a motor vehicle, the system and the control unit is adapted to effecting a downshift of the gearbox from a first gear, for which acceleration a of the vehicle is negative, to a second gear, for which the acceleration a is calculated to be positive or equal to nil, wherein the downshift involves at least one intermediate gear step between the first gear and the second gear, along with a maximum engine speed at each intermediate gear step which is as high as, or higher than, a highest engine speed at a preceding intermediate gear step.

18. A motor vehicle which comprises at least one system according to claim 17.

19. A method according to claim 2, wherein the threshold value is used as a parameter for determining a number of gear steps involved in a gear change between at least one of the first gear or an intermediate gear step, or between two consecutive intermediate gear steps, or between an intermediate gear step and the second gear.

* * * * *

UNITED STATES PATENT AND TRADEMARK OFFICE
CERTIFICATE OF CORRECTION

PATENT NO.        : 8,688,335 B2
APPLICATION NO. : 13/395489
DATED             : April 1, 2014
INVENTOR(S)       : Swartling et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 38 days.

Signed and Sealed this

Twenty-ninth Day of September, 2015

Michelle K. Lee
*Director of the United States Patent and Trademark Office*